(12) United States Patent
Peng (10) Patent No.: US 9,288,377 B2
(45) Date of Patent: Mar. 15, 2016

(54) SYSTEM AND METHOD FOR COMBINING FOCUS BRACKET IMAGES

(71) Applicant: Semiconductor Components Industries, LLC, Phoenix, AZ (US)

(72) Inventor: Honghong Peng, San Jose, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 211 days.

(21) Appl. No.: 13/870,387

(22) Filed: Apr. 25, 2013

(65) Prior Publication Data

US 2013/0308036 A1 Nov. 21, 2013

Related U.S. Application Data

(60) Provisional application No. 61/641,838, filed on May 2, 2012.

(51) Int. Cl.
*H04N 5/232* (2006.01)
*H04N 5/225* (2006.01)

(52) U.S. Cl.
CPC ......... *H04N 5/23212* (2013.01); *H04N 5/2258* (2013.01)

(58) Field of Classification Search
CPC .................................................. H04N 5/2356
See application file for complete search history.

(56) References Cited

U.S. PATENT DOCUMENTS

| | | | |
|---|---|---|---|
| 4,675,535 A | 6/1987 | Tsunekawa et al. | |
| 8,274,552 B2 | 9/2012 | Dahi et al. | |
| 8,311,362 B2 * | 11/2012 | Tamaru | 382/275 |
| 8,405,760 B2 | 3/2013 | Yamasaki | |
| 8,416,338 B2 * | 4/2013 | Nagasaka et al. | 348/348 |
| 8,576,327 B2 * | 11/2013 | Hikida | 348/345 |
| 2005/0244071 A1 * | 11/2005 | Zaharia et al. | 382/251 |
| 2008/0013941 A1 * | 1/2008 | Daley | 396/121 |
| 2008/0308928 A1 * | 12/2008 | Chang et al. | 257/723 |
| 2009/0167927 A1 | 7/2009 | Kusaka | |
| 2009/0169122 A1 * | 7/2009 | He et al. | 382/238 |
| 2009/0310885 A1 * | 12/2009 | Tamaru | 382/275 |
| 2010/0283868 A1 * | 11/2010 | Clark et al. | 348/231.4 |
| 2012/0194719 A1 * | 8/2012 | Churchwell et al. | 348/302 |
| 2013/0010067 A1 | 1/2013 | Veeraraghavan et al. | |
| 2013/0215290 A1 * | 8/2013 | Solhusvik et al. | 348/231.99 |

* cited by examiner

*Primary Examiner* — Gary C Vieaux
(74) *Attorney, Agent, or Firm* — Treyz Law Group, P.C.; Michael H. Lyons; Zachary D. Hadd (57) ABSTRACT

Imaging systems may be provided with stacked-chip image sensors and adjustable lens systems. A stacked-chip image sensor may include a vertical chip stack that includes an array of image pixels and processing circuitry. The adjustable lens system may pass light from a scene onto the image pixels at a number of focus positions. The image pixels may capture a focus bracket of image frames at a capture frame rate for light passed by the adjustable lens system at two or more of the focus positions. The processing circuitry may combine a set of image frames in the focus bracket to generate a focused image. The focused image may have one or more portions of the captured scene in focus. The processing circuitry may output the focused image to off-chip image processing circuitry at an output frame rate that is less than the capture frame rate.

13 Claims, 6 Drawing Sheets

FIG. 10

SYSTEM AND METHOD FOR COMBINING FOCUS BRACKET IMAGES

This application claims the benefit of provisional patent application No. 61/641,838, filed May 2, 2012, which is hereby incorporated by reference herein in their entireties.

BACKGROUND

This relates generally to imaging systems, and more particularly, to imaging systems with stacked-chip image sensors.

Image sensors are commonly used in imaging systems such as cellular telephones, cameras, and computers to capture images. In a typical arrangement, an image sensor is provided with an array of image sensor pixels and control circuitry for operating the image sensor pixels. In a conventional imaging system the control circuitry is laterally separated from the image sensor pixels on a silicon semiconductor substrate. Each row of image sensor pixels typically communicates with the control circuitry along a common metal line on the silicon semiconductor substrate. Similarly, each column of image sensor pixels communicates with the control circuitry along a common metal line.

In this type of system, the rate at which image pixel data can be read out from the image sensor pixels and the rate at which control signals can be supplied to the image sensor pixels can be limited by the use of the shared column and row lines. This type of limitation can limit the rate at which image frames may be captured.

When capturing images from a real-world scene using an image sensor, objects at different distances in the scene may be at different image focuses for the image sensor. Conventional, imaging systems capture and output images at a single image focus. Images captured using conventional image systems depict objects near the image focus clearly whereas objects far from the image focus may be out-of-focus or blurry.

It would therefore be desirable to be able to provide improved imaging systems with enhanced image focusing capabilities.

DETAILED DESCRIPTION

Digital camera modules are widely used in imaging systems such as digital cameras, computers, cellular telephones, or other electronic devices. These imaging systems may include image sensors that gather incoming light to capture an image. The image sensors may include arrays of image sensor pixels. The pixels in an image sensor may include photosensitive elements such as photodiodes that convert the incoming light into digital data. Image sensors may have any number of pixels (e.g., hundreds or thousands or more). A typical image sensor may, for example, have hundreds of thousands or millions of pixels (e.g., megapixels).

Each image sensor may be a stacked-chip image sensor having a vertical chip stack that includes an image pixel array die, a control circuitry die, and a digital processing circuitry die. Analog control circuitry on the control circuitry die may be coupled to the image pixel circuitry using vertical conductive paths (sometimes referred to as vertical metal interconnects or vertical conductive interconnects) such as through-silicon vias in a silicon semiconductor substrate. Storage and processing circuitry may be coupled to the analog control circuitry using vertical metal interconnects such as through-silicon vias in the silicon semiconductor substrate. The through-silicon vias may, if desired, be arranged in an array conductive vias. Vertical metal interconnects may be formed at an edge of an image pixel array or throughout an image pixel array. Vertical metal interconnects may be configured to couple rows of image pixels, columns of image pixels, blocks of image pixels, sub-arrays of image pixels, other groups of image pixels, or individual image pixels to the analog control circuitry.

Vertical metal interconnects may be used by the control circuitry to read out image data from image pixels in multiple pixel rows and multiple pixel columns simultaneously thereby increasing the rate at which image data can be obtained from the image pixels in comparison with conventional imaging systems. For example, image data may be captured at a frame rate that is high enough to oversample an oscillating light source such as an LED that oscillates at a frequency of hundreds of cycles per second or to oversample a rapidly moving object such as a baseball or football being thrown by an athlete. Oversampling an oscillating light source may include, for example, capturing image frames at a capture frame rate that is at least twice the number of oscillation cycles per second of the oscillating light source.

Figure 1:
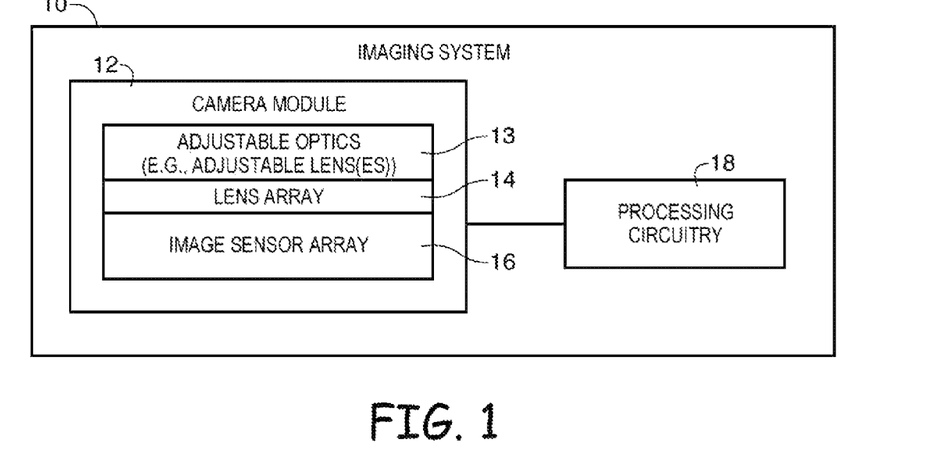
FIG. 1 is a diagram of an illustrative electronic device having stacked-chip image sensors in accordance with an embodiment of the present invention.

FIG. 1 is a diagram of an illustrative imaging system that uses a stacked-chip image sensor to capture images at a high frame rate in comparison with conventional planar imaging systems. Imaging system 10 of FIG. 1 may be a portable imaging system such as a camera, a cellular telephone, a video camera, or other imaging device that captures digital image data. Camera module 12 may be used to convert incoming light into digital image data. Camera module 12 may include adjustable optical components 13 (e.g., moveable lenses) and a corresponding array of stacked-chip image sensors 16. If desired, camera module 12 may also include additional lenses such as lens array 14. Adjustable lenses 13, lens array 14, and stacked-chip image sensors 16 may be mounted in a common package and may provide image data to processing circuitry 18.

Adjustable optical system 13 may include one or more lenses that move with respect to stacked-chip image sensors 16, whereas lens array 14 may be fixed with respect to stacked-chip image sensors 16. Adjustable optical system 13 may include, as examples, mechanically adjustable lenses, electrically adjustable lenses, electro-mechanically adjustable lenses, or any other adjustable lens system. Stacked-chip image sensor array 16 and/or processing circuitry 18 may be used to drive adjustable lenses 13 (e.g., by providing control signals that move or adjust adjustable lenses 13). Adjustable lenses 13 may be adjusted to focus light on image sensor array 16 from imaged objects at different distances with respect to image sensor array 16. Adjustable lenses 13 may be adjusted between two or more focus positions to focus light on lens array 14 and/or image sensor array 16. FIG. 1 is merely illustrative. If desired, camera module 12 may be formed without fixed lens array 14 (e.g., image sensor array 16 may receive light from adjustable lenses 13).

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured and processed by camera module 12 may, if desired, be further processed and stored using processing circuitry 18. Processed image data may, if desired, be provided to external equipment (e.g., a computer or other device) using wired and/or wireless communications paths coupled to processing circuitry 18.

Image sensor array 16 may contain an array of individual stacked-chip image sensors configured to receive light of a given color by providing each stacked-chip image sensor with a color filter. The color filters that are used for image sensor pixel arrays in the image sensors may for example, be red filters, blue filters, and green filters. Each filter may form a color filter layer that covers the image sensor pixel array of a respective image sensor in the array. Other filters such as white (clear) color filters, ultraviolet filters, dual-band IR cutoff filters (e.g., filters that allow visible light and a range of infrared light emitted by LED lights), etc. may also be used.

An array of stacked-chip image sensors may be formed on one or more semiconductor substrates. With one suitable arrangement, which is sometimes described herein as an example, each vertical layer of a stacked-chip image sensor array (e.g., the image pixel array layer, the control circuitry layer, or the processing circuitry layer) is formed on a common semiconductor substrate (e.g., a common silicon image sensor integrated circuit die). Each stacked-chip image sensor may be identical. For example, each stacked-chip image sensor may be a Video Graphics Array (VGA) sensor with a resolution of 480×640 sensor pixels (as an example). Other types of image sensor may also be used for the image sensors if desired. For example, images sensors with greater than VGA resolution or less than VGA resolution may be used image sensor arrays in which the image sensors are not all identical may be used, etc. If desired, image sensor array 16 may include a single stacked-chip image sensor.

Figure 2:
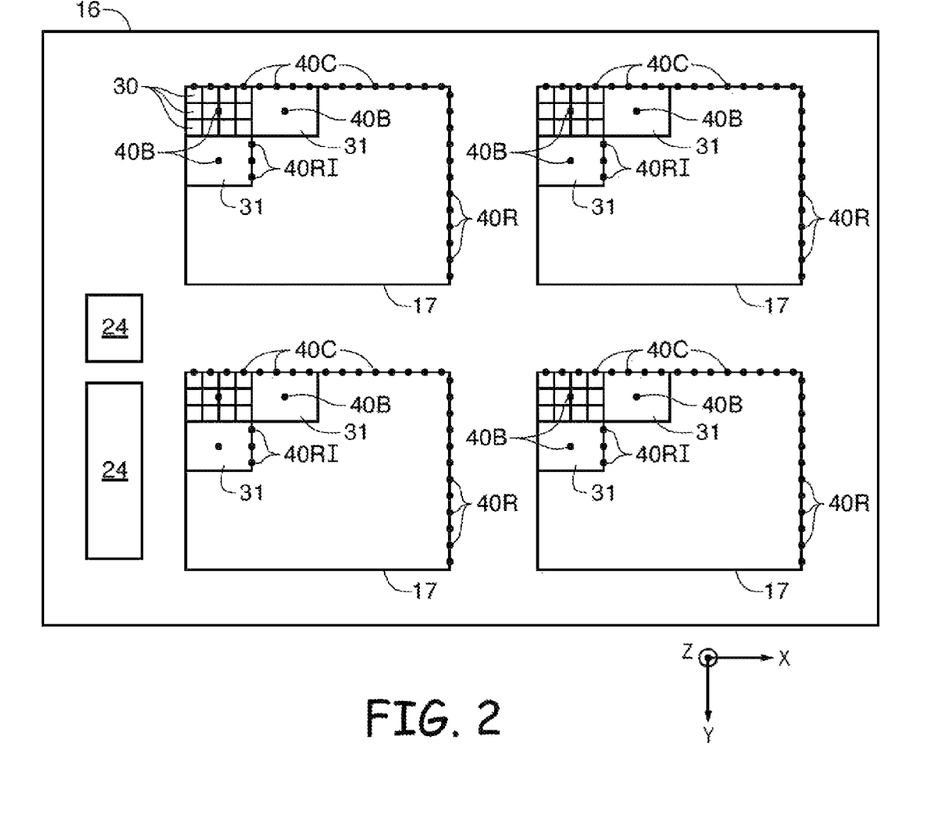
FIG. 2 is a top view of an illustrative image sensor array having a plurality of stacked-chip image sensors each having vertical conductive interconnects for coupling image pixel sub-arrays to control circuitry in accordance with an embodiment of the present invention.

As shown in FIG. 2, image sensor array 16 may include multiple image pixel arrays such as image pixel arrays 17 that are formed on a single integrated circuit die. In the example of FIG. 2, image sensor array 16 includes four stacked-chip image sensors. However, this is merely illustrative. If desired, image sensor array 16 may include a single stacked-chip image sensor, two stacked-chip image sensors, three stacked-chip image sensors, or more than four stacked-chip image sensors.

Each pixel array 17 may have image sensor pixels such as image pixels 30 that are arranged in rows and columns. Each image sensor pixel array 17 may have any suitable resolution (e.g., 640×480, 4096×3072, etc.). Image sensor pixels 30 may be formed on a planar surface (e.g., parallel to the x-y plane of FIG. 2) of a semiconductor substrate such as a silicon die.

As shown in FIG. 2, each image pixel array 17 may be provided with an array of vertical conductive paths such as conductive interconnects 40 (e.g., metal lines, through-silicon vias, etc. that run perpendicular to the x-y plane of FIG. 2) such as row interconnects 40R, column interconnects 40C, pixel sub-array interconnects 40B, and internal row interconnects 40RI. Row interconnects 40R, column interconnects 40C, pixel sub-array interconnects 40B, and internal row interconnects 40RI may each be configured to couple one or more image pixels 30 to control circuitry (e.g., analog control circuitry) that is vertically stacked with the associated image pixel array (e.g., stacked in the z-direction of FIG. 2).

For example, a row interconnect 40R may couple an associated row of image sensor pixels 30 to control circuitry such as row driver circuitry that is vertically stacked with an image pixel array 17. Row interconnects 40R may be coupled to pixel rows along an edge of image pixel array 17. Each pixel row may be coupled to one of row interconnects 40R. A column interconnect 40C may couple an associated column of image sensor pixels 30 to control circuitry that is vertically stacked with an image pixel array 17. Each image pixel array 17 may be partitioned into a number of image pixel sub-arrays 31. Pixel sub-arrays 31 may include a set of image pixels 30 from image pixel array 17. In the example of FIG. 2, each pixel sub-array 31 includes a group of image pixels 30 arranged in a rectangular pattern. Each pixel sub-array 31 may be, for example, a 4×4 pixel sub-array, an 8×8 pixel sub-array, a 16×16 pixel sub-array, a 32×32 pixel sub-array, etc.

In general, pixel sub-arrays 31 may include image pixels 30 arranged in any desired pattern. If desired, pixel sub-arrays 31 may have a shape that is neither square nor rectangular (e.g., a pixel block may contain 3 pixels of one pixel row, 5 pixels of another pixel row and 10 pixels of a third pixel row, or any arbitrary grouping of adjacent pixels). All pixel sub-arrays 31 may include the same number of pixels 30 or some pixel sub-arrays 31 may include different numbers of pixels than other sub-arrays 31. All pixel sub-arrays 31 may have the same shape (e.g., all sub-arrays 31 may be square or all sub-arrays 31 may be rectangular), or some sub-arrays 31 may have different shapes than other sub-arrays.

Each pixel sub-array 31 in a given image pixel array 17 may be coupled via an associated sub-array interconnect 40B to control circuitry such as analog-to-digital conversion circuitry that is vertically stacked with image pixel array 17. An internal row interconnect 40RI may couple a portion of a row of image sensor pixels 30 (e.g., a row of image pixels 30 within a particular pixel sub-array 31) to control circuitry that is vertically stacked with an image pixel array 17. Each pixel row in image pixel array 17 may be coupled to multiple internal row interconnects 40RI. Internal row interconnects 40RI may be coupled to image pixels 30 along an edge of one or more pixel sub-arrays 31 and may couple the pixels 30 of that pixel sub-array 31 to the control circuitry.

Row interconnects 40R, column interconnects 40C, pixel sub-array interconnects 40B, and internal row interconnects 40RI may each be formed from for example, through-silicon vias that pass from a first silicon semiconductor substrate (e.g., a substrate having an image pixel array) to a second silicon semiconductor substrate (e.g., a substrate having control and readout circuitry for the image pixel array). If desired, image sensor array 16 may include support circuitry 24 that is horizontally (laterally) separated from image pixel arrays 17 on the semiconductor substrate.

Figure 3:
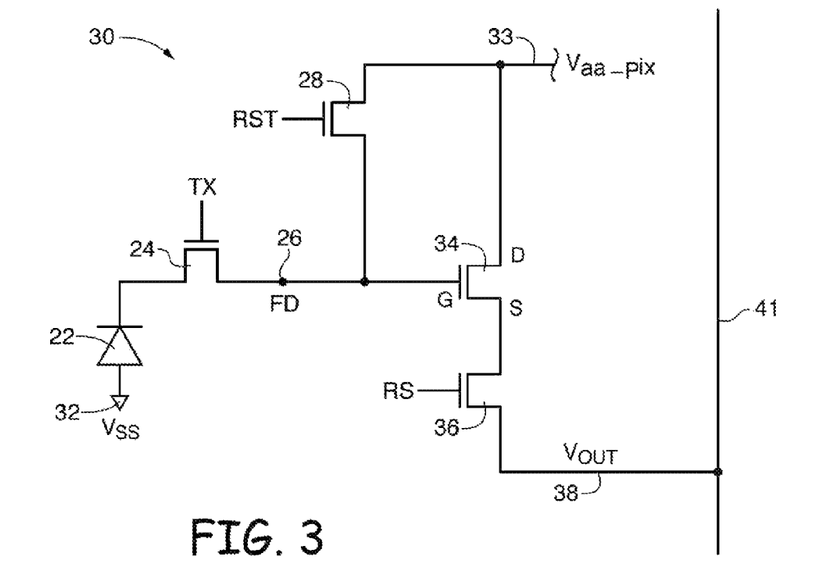
FIG. 3 is a diagram of an illustrative image sensor pixel in accordance with an embodiment of the present invention.

Circuitry in an illustrative image pixel 30 of a given stacked-chip image pixel array 17 is shown in FIG. 3. As shown in FIG. 3, pixel 30 may include a photosensitive element such as photodiode 22. A positive pixel power supply voltage (e.g., voltage Vaa_pix) may be supplied at positive power supply terminal 33. A ground power supply voltage (e.g., Vss) may be supplied at ground terminal 32. Incoming light is gathered by photodiode 22 after passing through a color filter structure. Photodiode 22 converts the light to electrical charge.

Before an image is acquired, reset control signal RST may be asserted. This turns on reset transistor 28 and resets charge storage node 26 (also referred to as floating diffusion FD) to Vaa. The reset control signal RST may then be deasserted to turn off reset transistor 28. After the reset process is complete, transfer gate control signal TX may be asserted to turn on transfer transistor (transfer gate) 24. When transfer transistor 24 is turned on, the charge that has been generated by photodiode 22 in response to incoming light is transferred to charge storage node 26.

Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) may exhibit a capacitance that can be used to store the charge that has been transferred from photodiode 22. The signal associated with the stored charge on node 26 is conveyed to row select transistor 36 by source-follower transistor 34.

If desired, other types of image pixel circuitry may be used to implement the image pixels of sensors 16. For example, each image sensor pixel 30 (see. e.g., FIG. 1) may be a three-transistor pixel, a pin-photodiode pixel with four transistors, a global shutter pixel, etc. The circuitry of FIG. 3 is merely illustrative.

When it is desired to read out the value of the stored charge (i.e., the value of the stored charge that is represented by the signal at the source S of transistor 34), select control signal RS can be asserted. When signal RS is asserted, transistor 36 turns on and a corresponding signal Vout that is representative of the magnitude of the charge on charge storage node 26 is produced on output path 38. In a typical configuration, there are numerous rows and columns of pixels such as pixel 30 in the image sensor pixel array of a given image sensor. A conductive path such as path 41 can be associated with one or more pixels such as a particular sub-array 31 of image pixels 30.

When signal RS is asserted in a given sub-array of pixels, path 41 can be used to route signal Vout from pixels in that sub-array to readout circuitry. Path 41 may, for example, be coupled to one of sub-array interconnects 40B. Image data such as charges collected by photosensor 22 may be passed along one of sub-array interconnects 40B to associated control and readout circuitry that is vertically stacked with image pixel array 17. In this way, multiple pixel sub-arrays 31 in a given pixel array 17 may be readout in parallel and at high frame rates relative to conventional planar image systems. If desired, image data from two or more sub-arrays 31 in a given pixel array 17 may be subsequently processed in parallel by storage and processing circuitry in stacked-chip image sensor 16.

Figure 4:
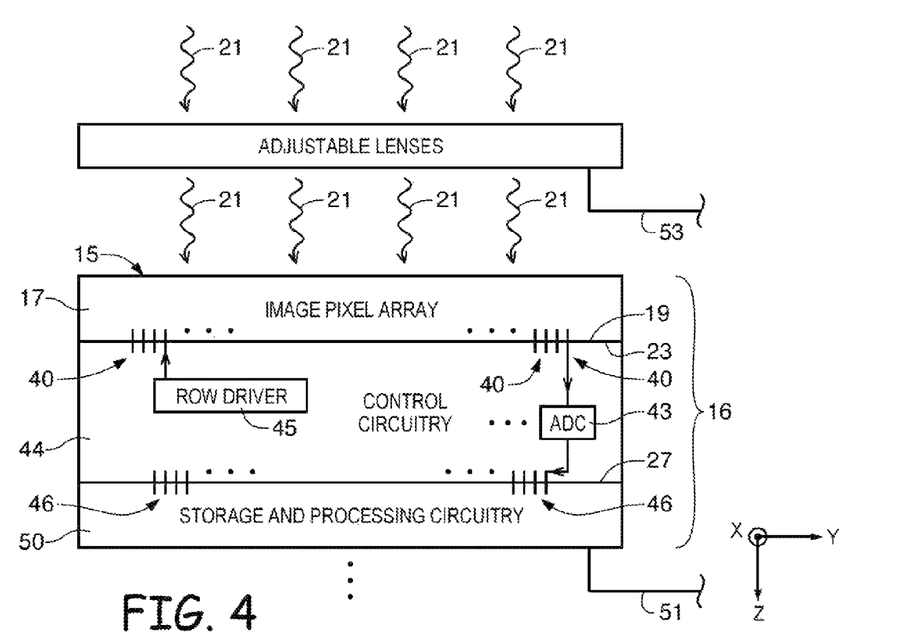
FIG. 4 is a diagram of an illustrative adjustable lens system and stacked-chip image sensor having an image pixel array in a vertical chip stack that includes control circuitry and storage and processing circuitry coupled by vertical metal interconnects in accordance with an embodiment of the present invention.

As shown in FIG. 4, an image pixel array such as image pixel array 17 may be formed in a vertical chip stack with analog control and readout circuitry such as control circuitry 44 and storage and processing circuitry such as storage and processing circuitry 50. If desired, image pixel array 17 may be a front-side illuminated (FSI) image pixel array in which image light 21 is received by photosensitive elements through a layer of metal interconnects or may be a backside illuminated (BSI) image pixel array in which image light 21 is received by photosensitive elements formed on a side that is opposite to the side on which the layer of metal interconnects is formed.

Image pixel array 17 may be formed on a semiconductor substrate that is configured to receive image light 21 through a first surface (e.g., surface 15) of the semiconductor substrate. Image light 21 from a scene may be focused onto image pixel array 17 using adjustable lenses 13. Adjustable lenses 13 may be adjusted between multiple focus positions to focus light from objects at different distances in the scene onto image pixel array 17. Control circuitry 44 may be formed on an opposing second surface (e.g., surface 19) of the semiconductor substrate. Control circuitry 44 may be formed on an additional semiconductor substrate (semiconductor integrated circuit die) having a surface such as surface 23 that is attached to surface 19 of image pixels array 17. Control circuitry 44 may be coupled to image pixels in image pixel array 17 using vertical conductive paths (vertical conductive interconnects) 40 (e.g., row interconnects 40R, column interconnects 40C, pixel sub-array interconnects 40B, and/or internal row interconnects 40RI of FIG. 2).

Vertical conductive interconnects 40 may be formed from metal conductive paths or other conductive contacts that extend through surface 19 and surface 23. As examples, vertical conductive interconnects 40 may include through-silicon vias that extend through surface 19 and/or surface 23, may include microbumps that protrude from surface 19 into control circuitry substrate 44 through surface 23, may include microbumps that protrude from surface 23 into image pixel array substrate 17 through surface 23, or may include any other suitable conductive paths that vertically couple pixel circuitry in image pixel array 17 to control circuitry 44.

Image pixel array 17 may include one or more layers of dielectric material having metal traces for routing pixel control and readout signals to image pixels 30. Vertical conductive interconnects 40 (e.g., row interconnects 40R, column interconnects 40C, pixel sub-array interconnects 40B, and/or internal row interconnects 40RI of FIG. 2) may be coupled to metal traces in image pixel array 17.

Image data such as signal Vout (FIG. 3) may be passed from pixel output paths 40 (FIG. 3) along interconnects 40 from image pixel array 17 to control circuitry 44. Control signals such as reset control signal RST, row/pixel select signal RS, transfer signal TX or other control signals for operating pixels 30 may be generated using control circuitry 44 and passed vertically to pixels 30 in image pixel array 17 along vertical interconnects 40.

Control circuitry 44 may be configured to operate pixels 30 of image pixel array 17. Control circuitry 44 may include row control circuitry (row driver circuitry) 45, bias circuitry (e.g., source follower load circuits), sample and hold circuitry, correlated double sampling (CDS) circuitry, amplifier circuitry, analog-to-digital (ADC) conversion circuitry 43, data output circuitry, memory (e.g., buffer circuitry), address circuitry, etc. Control circuitry 44 may be configured to provide bias voltages, power supply voltages or other voltages to image pixel array 17. Control circuitry 44 may be formed as a stacked layer of image pixel array 17 that is coupled to pixel circuitry of pixel array 17 or may be formed on an additional semiconductor integrated circuit die that is coupled to image pixel array 17 using interconnects 40. Some interconnects 40 may be configured to route image data from image pixel array 17 to ADC circuit 43. Digital image data from ADC converter 43 may then be provided to storage and processing circuitry 50. Storage and processing circuitry 50 may, for example, be an image coprocessor (ICOP) chip that is stacked with control circuitry 44.

Image data signals read out using control circuitry 44 from photosensitive elements on image pixel array 17 may be passed from control circuitry 44 to storage and processing circuitry 50 that is vertically stacked (e.g., in direction z) with image pixel array 17 and control circuitry 44 along vertical interconnects such as interconnects 46. Vertical interconnects 46 may include through-silicon vias, microbumps or other suitable interconnects that couple metal lines in control circuitry 44 to metal lines in processing circuitry and storage 50.

Circuitry 50 may be partially integrated into control circuitry 44 or may be implemented as a separated semiconductor integrated circuit that is attached to a surface such as surface 27 of control circuitry 44. Image sensor 16 may include additional vertical conductive interconnects 46 such as metal conductive paths or other conductive contacts that extend through surface 27. As examples, vertical conductive interconnects 46 may include through-silicon vias that extend through surface 27, may include microbumps that protrude from surface 27 into processing circuitry substrate 50, or may include any other suitable conductive paths that vertically couple control circuitry 44 to storage and processing circuitry 50.

Processing circuitry 50 may include one or more integrated circuits (e.g., image processing circuits, microprocessors, storage devices such as random-access memory and non-volatile memory, etc.) and may be implemented using components that are separate from control circuitry 44 and/or that form part of control circuitry 44.

Image data that has been captured by image pixel array 17 may be processed and stored using processing circuitry 50. Storage and processing circuitry may, for example, process image data from multiple pixel sub-arrays 31 in parallel. Image data may be captured at a capture frame rate using image pixel array 17 and processed using storage and processing circuitry 50. The capture frame rate may be a high speed frame rate such as, for example, 70 frames per second, 90 frames per second, 120 frames per second, or greater than 120 frames per second. Processed image data may be stored in storage and processing circuitry 50 or may be passed to external circuitry such as circuitry 18 along, for example, path 51. Processed image data may be passed to circuitry 18 at an output frame rate that is lower than the capture frame rate. Multiple image frames captured at the capture frame rate may be combined to form the processed image data that is output from stacked-chip image sensor 16 at the output frame rate.

Storage and processing circuitry 50 formed in a vertical stack with image pixel array 17 may, for example, select a subset of digital image data to use in constructing a final image (e.g., image data from one or more captured frames of image data), may combine multiple frames that contain transient signals (e.g., image signals from a flashing light or a moving object) to form corrected image frames, may extract image depth information, or may provide processing options to a user of system 10.

Storage and processing circuitry 50 (sometimes referred to as stacked processing circuitry or stacked-chip processing circuitry) may be used to blend image data from red, blue, and green sensors to produce full-color images, may be used to determine image parallax corrections, may be used to produce 3-dimensional (sometimes called stereo) images using data from two or more different sensors that have different vantage points when capturing a scene, may be used to produce increased depth-of-field images using data from two or more image sensors, may be used to adjust the content of an image frame based on the content of a previous image frame, or may be used to otherwise process image data.

Stacked processing circuitry 50 may be configured to perform white balancing, color correction, high-dynamic-range image combination, motion detection, object distance detection, or other suitable image processing on image data that has been passed vertically from control circuitry 44 to processing circuitry 50. Processed image data may, if desired, be provided to external equipment (e.g., a computer, other device, or additional processing circuitry such as processing circuitry 18) using wired and/or wireless communications paths coupled to processing circuitry 50.

When capturing images from a real-world scene using an image sensor, objects at different distances in the scene may be at different focuses for the image sensor (sometimes referred to as image focuses or image points). For example, an object in the foreground of the scene may be at a different image focus than an object in the background of the scene. A conventional imaging system captures and outputs images at a single focus (e.g., images that either focus on an object in the foreground or an object in the background). Images captured using conventional systems depict objects near the image focus clearly whereas objects that are far from the image focus may be out-of-focus or blurry. It may therefore be desirable to be able to provide image sensors with flexible image focusing capabilities e.g., to provide a clear image of objects in a scene at multiple distances).

Stacked-chip image sensor 16 may capture images from a scene at different image focuses (e.g., based on the focus position of adjustable lenses 13, the distance between camera module 12 and objects in the scene, etc.). Stacked-chip image sensor 16 may capture a sequence of image frames at a high-speed capture frame rate for multiple image focus points to form a variable focus image bracket of the scene (sometimes referred to herein as a focus bracket of image frames). For example, stacked-chip image sensor 16 may capture a number of high-frame-rate image frames while adjusting the focus position (sometimes referred to as focal point or focal length) of adjustable lenses 13. For example, adjustable lenses 13 may be synchronized with the capture of variable focus image brackets using stacked-chip image sensor 16 so that each image frame in the variable focus image bracket is captured at a different focus position of lens system 13.

Adjustable lenses 13 may be coupled to stacked-chip image sensor 16 and/or external processing circuitry 18 via a control path such as path 53. Stacked-chip image sensor 16 and/or processing circuitry 18 may convey control signals (e.g., periodic pulse step control signals) to adjustable lenses 13 that instruct adjustable lenses 13 to change focus position while stacked-chip image sensor 16 captures image frames to form the variable focus image bracket.

In another suitable arrangement stacked-chip image sensor 16 may be formed on a moveable substrate (e.g., a mechanically adjustable substrate, electrically moveable substrate, electro-mechanically moveable substrate, etc.). In this scenario, stacked-chip image sensor 16 may be moved relative to adjustable lenses 13 to adjust the focus of light captured by image pixel array 17. In another suitable arrangement, both stacked-chip image sensor 16 and adjustable lenses 13 may be moved to provide focusing for light captured by image pixel array 17.

Adjustable lenses 13 may provide a range of focus positions for image sensor 16. For example, adjustable lenses 13 may be adjusted to focus light on image sensor 16 from a nearest possible focus position (which focuses on objects that are nearer to image sensor 16) to a farthest possible local position (which focuses on objects that are farther from image sensor 16). Adjustable lenses 13 may be continuously adjusted between the nearest possible focus position and the farthest possible focus position while capturing a variable focus image bracket using stacked-chip image sensor 16. If desired, stacked-chip image sensor 16 may capture a variable focus image bracket while adjustable lenses 13 are adjusted between any subset of focus positions between the nearest possible focus position and the farthest possible focus position. Adjustable lenses 13 may thereby be continuously adjusted to provide stacked-chip image sensor 16 with images of a scene having multiple image focuses.

Stacked processing, circuitry 50 in stacked-chip image sensor 16 may subsequently process the captured variable focus image bracket to generate a focused image having image data at any desired number of image focuses. For example, stacked processing circuitry 30 may select and combine image frames from the captured variable focus image bracket so that one or more portions of scene are in-focus in the focused image (e.g., so that objects at different distances in the imaged scene appear in-focus in the final focused image). Stacked processing circuitry 50 may output the final focused image from stacked image sensor 16. If desired, stacked processing circuitry 50 may select and combine image frames from the captured variable focus image bracket so that the image that is outputted from stacked-chip image sensor 16 is in focus for the entire imaged scene (e.g., so that each object in the captured scene is in focus for the final outputted image).

Figure 5:
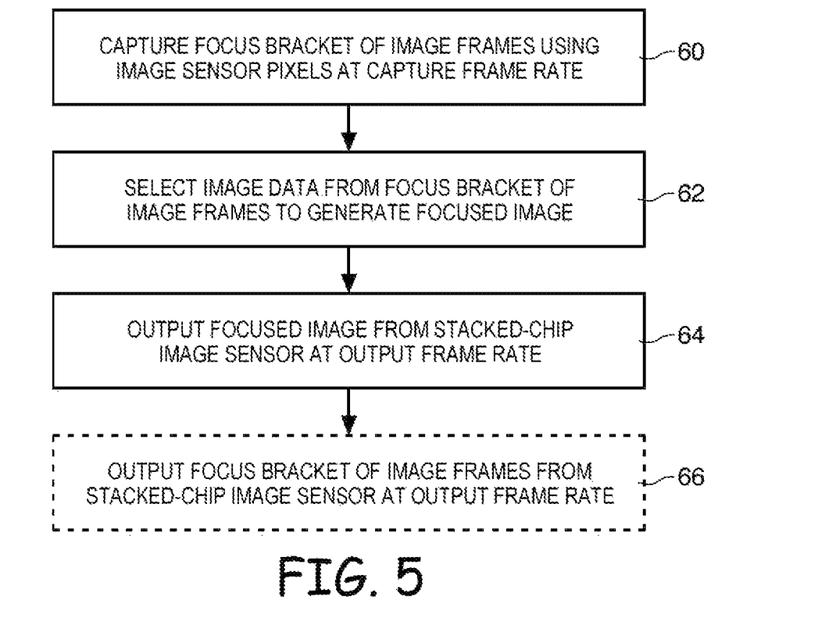
FIG. 5 is allow chart of illustrative steps involved in generating focused images using a stacked-chip image sensor and adjustable lens system of the type shown in FIG. 4 in accordance with an embodiment of the present invention.

FIG. 5 is a flow chart of illustrative steps that may be used for generating focused images (e.g., images having multiple image focuses) using a stacked-chip image sensor and adjustable lens system such as stacked-chip image sensor 16 and adjustable lenses 13 of FIG. 4.

At step 60, image pixel array 70 of stacked-chip image sensor 16 may capture a variable focus image bracket from a scene. For example, stacked-chip image sensor 16 may capture a sequence of high-frame-rate image frames each having different image focuses (e.g., corresponding to different focus positions of adjustable lenses 13).

Image pixel array 70 may capture each image frame of the variable focus image bracket at a capture frame rate. The capture frame rate may be a high-speed frame rate such as, for example, 90 frames per second, 120 frames per second, or greater than 120 frames per second. Image pixel array 70 may transfer each captured image frame to stacked processing circuitry 50 (e.g., over vertical conductive paths 40). Stacked processing circuitry 50 may store each image frame of the variable focus image bracket for subsequent processing.

At step 62, stacked processing circuitry 50 may select image data from the variable focus image bracket to generate a focused image. For example, processing circuitry 50 may select image frames from the variable focus image bracket having image focuses for objects at different distances in the scene. Processing circuitry 50 may combine the selected image frames to generate a focused image that has multiple image focuses. For example, processing circuitry 50 may combine image data from a first image frame having the background of the scene in focus with image data from a second image frame having the foreground of the scene in focus to generate a focused image having both the background and the foreground of the scene in focus.

At step 64, stacked processing circuitry 50 may output the focused image from stacked-chip image sensor 16 to separate processing, circuitry (e.g., processing circuitry that is not formed as a part of stacked image sensor 16 such as processing circuitry 18 of FIG. 1). The focused image may be output from stacked storage and processing circuitry 50 at an output frame rate. The output frame rate may be less than the capture frame rate with which image pixel array 17 captured the image data. For example, the output frame rate may be 60 frames per second or less or may be 30 frames per second or less. If desired, the output frame rate may be sufficiently low to allow the focused image frames to be displayed using conventional display systems (e.g., 30 frame per second display systems, 24 frame per second display systems, etc.).

At optional step 66, stacked processing circuitry 50 may output the captured variable focus image bracket from stacked-chip image sensor 16 to processing circuitry 18 (e.g., stacked-chip image sensor 16 may output each image frame of the captured focus bracket of image frames). If desired, image frames from the variable focus image bracket may be selected separately from stacked-chip image sensor 16 (e.g., by a user or by processing circuitry 18). For example, a user of imaging system 10 may manually select image frames from the captured variable focus image bracket to generate a final image with a desired image focus for the captured scene (e.g., after image capture operations have been completed).

Figure 6:
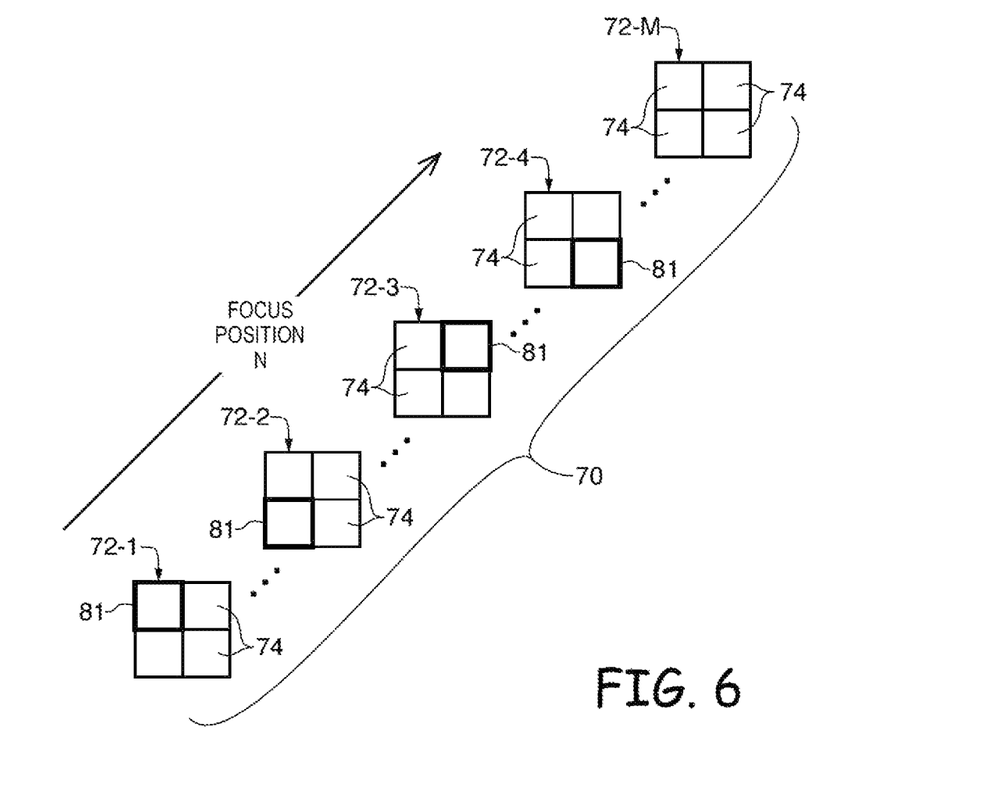
FIG. 6 is a diagram of illustrative image frames in a variable focus image bracket that may be captured using a stacked-chip image sensor for generating images having multiple image focuses in accordance with an embodiment of the present invention.

FIG. 6 is an illustrative diagram that shows how stacked processing circuitry 50 may identify image frames having different image focuses from the captured focus bracket for generating a focused image. As shown in FIG. 6, image pixel array 17 may capture a focus bracket 70 of M image frames 72 (e.g., image frames such as image frame 72-1, image frame 72-2, image frame 72-3, image frame 72-M, etc.). Each image frame 72 in focus bracket 70 may be captured using a different focus position N of adjustable optical system 13. For example, image frame 72-1 may be captured using a nearest possible focus position, image frame 72-M may be captured using a farthest possible focus position, and image frames 72-2, 72-3, and 72-4 may be captured using intermediate focus positions.

Each image frame 72 may be partitioned into a number of image regions 74 (sometimes referred to as image portions or image frame portions). In the example of FIG. 6, each image frame includes four image regions 74. This is merely illustrative. If desired, image frames 72 may be partitioned into any number of image regions 74. Each image region 74 may include image data captured using any number of image pixels 30 in image pixel array 17. In one suitable arrangement, each image region 74 may include image data captured using a particular sub-array 31 in image pixel array 17.

Stacked processing circuitry 50 may compare image data in each captured image frame 72 to identify focused regions 81 in focus bracket 70. For example stacked processing circuitry 50 may compare image data for each image region 74 across captured image frames 72 to determine which image frame 72 has the best image focus for each image region 74. Each focused region 81 may be subsequently combined to generate a focused image frame that is in-focus for each image region 74 (e.g., the focused image frame may include the best-focused image data from captured focus bracket 70 for each image region 74). In the example of FIG. 6, the top-left image region 74 of image frame 72-1, the bottom-left image region 74 of image frame 72-2, the top-right image region 74 of image frame 72-3 and the bottom-right image region 74 of image frame 72-4 are combined to produce the focused image.

If desired, stacked processing circuitry 50 may perform object detection operations on captured image frames. For example, stacked processing circuitry 50 may detect an object in as captured focus bracket and may identify image frames of the focus bracket for which the detected object is in focus as focused image frames. In this way, stacked processing circuitry 50 may track objects across multiple frames in the variable focus image bracket to ensure that the objects are in focus even if the objects move relative to stacked-chip image sensor 16.

Figure 7:
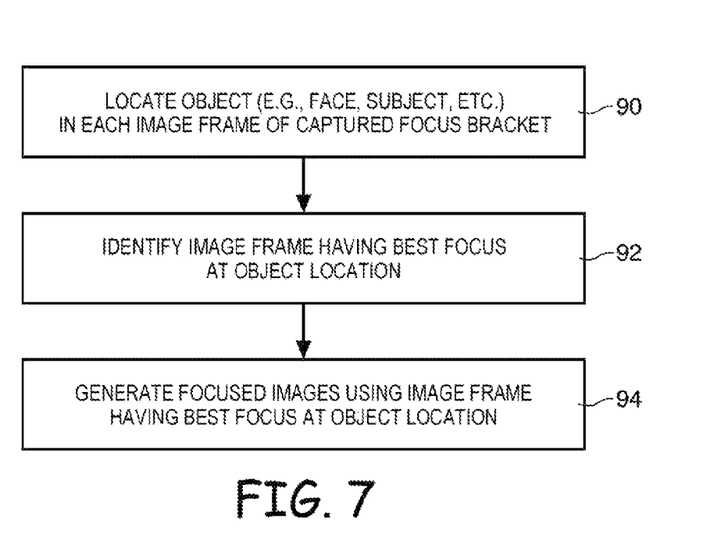
FIG. 7 is a flow chart of illustrative steps involved in detecting and focusing on objects from a scene in image frames in a variable focus image bracket captured using a stacked-chip image sensor and adjustable lens system in accordance with an embodiment of the present invention.

FIG. 7 is a flow chart of illustrative steps that may be used for detecting and focusing on an object in an imaged scene using a stacked-chip image sensor and adjustable lens system such as stacked-chip image sensor 16 and adjustable lenses 13 of FIG. 4. The steps of FIG. 7 may, for example, be performed while processing step 62 of FIG. 5 (e.g., after receiving as captured variable focus image bracket from image pixel array 17).

At step 90, stacked processing circuitry 50 may locate an object in each image frame of the captured focus bracket. For example, stacked processing circuitry 50 may identity a set of image pixels 30 having image data associated with a particular object in the imaged scene (e.g., a face, a moving object, etc.). The located object may, for example, correspond to (or be located within) particular image regions 74 in captured focus bracket 70 of FIG. 6. Processing circuitry 50 may locate the object by, for example, performing motion detection operations on the captured image frames, by comparing objects in captured image frames to a predetermined object such as a face, or an other desired method for detecting an object in captured image frames.

At step 92, stacked processing circuitry 50 may identify image frames in the captured focus bracket for which the detected object is most in-focus (e.g., by comparing the image region having the detected object to other image frames in the focus bracket).

At step 94, stacked processing circuitry 50 may generate focused images using the image frames having best-focus in the image region of the detected object (e.g., the image frames having the best image focus for the detected object may be selected as the focused images). Processing circuitry 50 may subsequently output the focused images from stacked-chip image sensor 16. In a scenario where the detected object is moving relative to the stacked-chip image sensor 16, stacked-chip image sensor 16 may track the object so that the object remains in focus in the outputted focused image frames.

Figure 8:
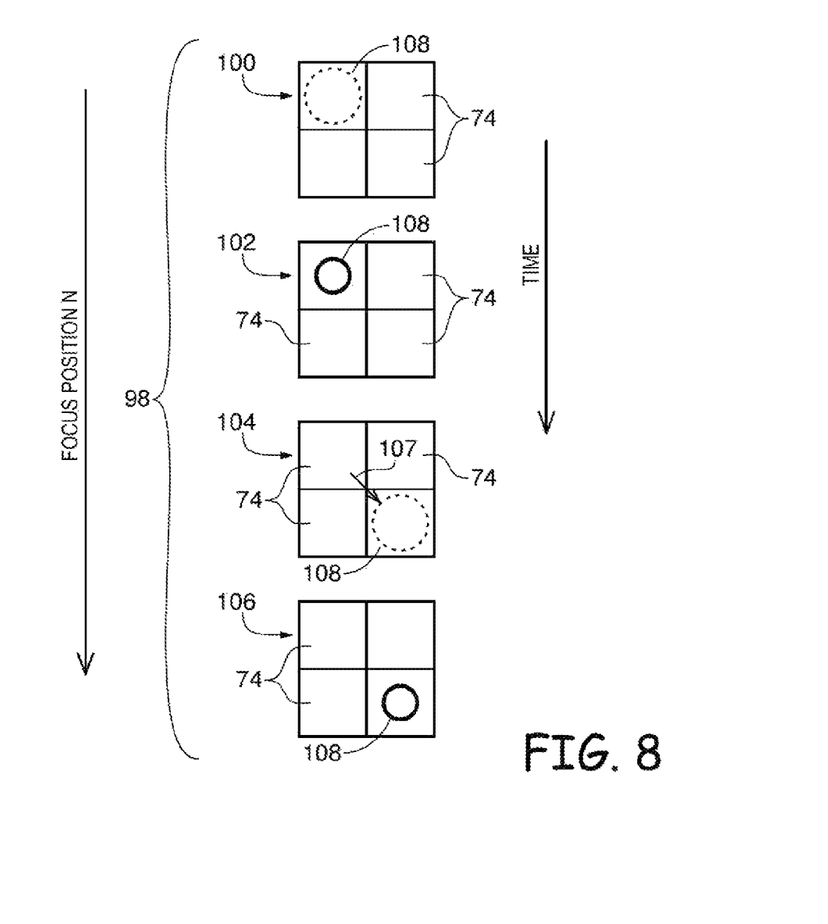
FIG. 8 is a diagram of illustrative image frames having a detected object that may be combined using a stacked-chip image sensor for generating focused images that track and focus on the detected object in accordance with an embodiment of the present invention.

FIG. 8 is an illustrative diagram that shows how stacked processing circuitry 50 may select image frames having a detected object in focus to output from stacked-image sensor 16. As shown in FIG. 8, stacked-chip image sensor 16 may capture a variable focus image bracket 98 of image frames (e.g., a sequence of image frames captured at different focus positions N of adjustable lenses 13 over time).

Stacked processing circuitry 50 may detect an object 108 (e.g., a face, a moving ball, etc.) in each image frame of focus bracket 98. In a first image frame 100 of focus bracket 98, processing circuitry 50 detects object 108 in the top-left image region 74 of first image frame 100 (e.g., an image frame at a first focus position). Object 108 in image frame 100 may be out of focus (blurry). Stacked processing circuitry 50 may detect object 108 in the top-left image region 74 of a second image frame 102 in focus bracket 98 (e.g., an image frame at a second focus position). Object 108 in second image frame 102 may be in focus. Processing circuitry 50 may compare the top-left image region 74 of image frame 100 to the top-left image region 74 of image frame 102 to determine that object 108 is in focus for frame 102 whereas object 108 is out of focus for frame 100.

Between capturing image frames 102 and 104, object 108 may move between image regions 74 as shown by arrow 107. Stacked processing circuitry 50 may detect object 108 in the bottom-right image region 74 of third image frame 104. Object 108 in image frame 104 may be out of focus (e.g., the distance between object 108 and image sensor 16 may have changed between capturing image frames 102 and 104). Stacked processing circuitry 50 may detect object 108 in the bottom-right image region 74 of fourth image frame 106. Object 108 in fourth image frame 104 may be in focus. Processing circuitry 50 may compare the bottom-right image region 74 of image frame 104 to the bottom-right image region 74 of image frame 106 to determine that object 108 is in focus for frame 106 and out of focus for frame 104.

Image frames 102 and 106 may be subsequently identified as focused image frames. Stacked processing circuitry 50 may output focused image frames 102 and 106 having object 108 in focus from stacked-chip image sensor 16. In this way, object 108 may be tracked by stacked-chip image sensor 16 so that object 108 is in focus for the outputted image frames regardless of the motion of object 108 relative to image sensor 16.

In another suitable arrangement, stacked processing circuitry 50 may sequentially process each image frame of a captured variable focus image bracket (e.g., processing circuitry 50 may process captured image frames while image pixel array 17 captures the remaining image frames of the variable focus image bracket).

Figure 9:
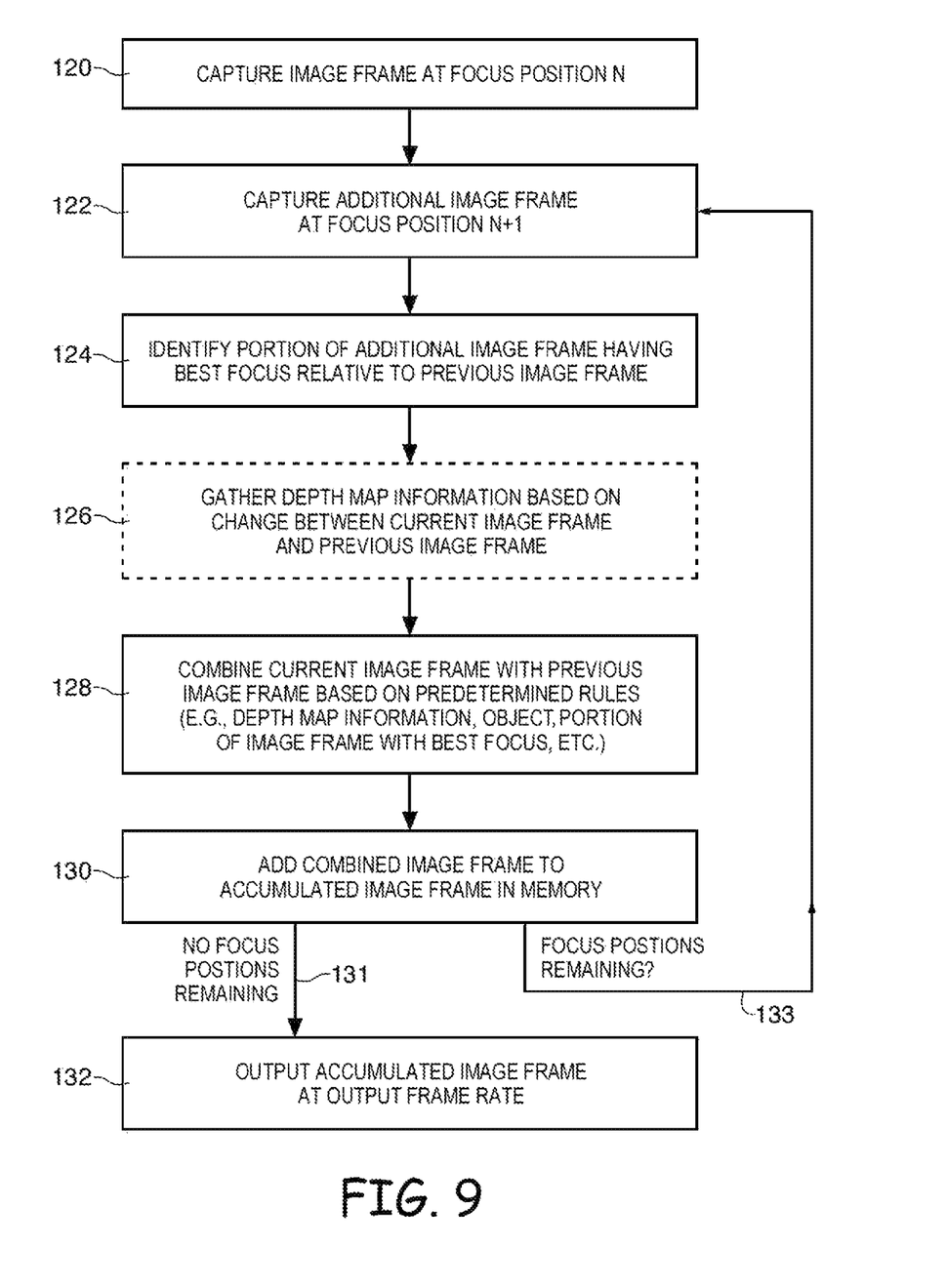
FIG. 9 is a now chart of illustrative steps involved, in generating focused images using a stacked-chip image sensor by processing image frames from a variable focus image bracket while capturing additional image frames in the variable focus image bracket in accordance with an embodiment of the present invention.

FIG. 9 is a flow chart of illustrative steps that may be used for sequentially processing image frames of a captured variable focus image bracket using stacked-chip image sensor 16 and adjustable lenses 13.

At step 120, image pixel array 17 in stacked-chip image sensor 16 may capture an image frame at focus position N (e.g., an image frame captured with adjustable lenses 13 at focus position N and sometimes referred to as image frame N). The captured image frame may be transferred to stacked processing circuitry 50.

At step 122, image pixel array 17 may capture an image frame at focus position N+1 (e.g., an image frame captured with adjustable lenses 13 at focus position N+1 and sometimes referred to as image frame N+1). The captured image frame at focus position N+1 may be transferred to stacked processing circuitry 50. The captured image frames may be captured at a high frame rate (e.g., a frame rate greater than or equal to 90 frames per second, greater than or equal to 120 frames per second, etc.).

At step 124, stacked processing circuitry 50 may compare the image frame at focus position N+1 to previously captured image frames (e.g., to the image frame at focus position N) to identify an image region in the N+1 image frame having a best focus relative to the previously captured image frames. For example, stacked processing circuitry 50 may identify a focused region 81 of captured image frames 72 as shown in FIG. 6.

At optional step 126, stacked processing circuitry 50 may gather depth map information for the imaged scene (e.g., information about the distance between each object in the imaged scene and stacked-chip image sensor 16) based on changes between the current image frame and previous image frames. For example, stacked processing circuitry 50 may gather depth map information by calculating differences between two image frames captured with different focus positions (e.g., between image frames N and N+1).

As an example, processing circuitry 50 may determine the depth map information by computing Fourier transforms of image data from two adjacent image frames such as image frames N and N+1. Processing circuitry 50 may identify a first circle of confusion around the image focus for captured image frame N+1 and a second circle of confusion around the image focus for captured image frame N. Processing circuitry 50 may compute a Fourier transform of the first circle of confusion and a Fourier transform of the second circle of confusion. Processing circuitry may compute additional Fourier transforms for the image data over image frame N and for the image data over image frame N+1. Processing circuitry 50 may multiply the Fourier transform of the circle of confusion for each image frame with the Fourier transform of the associated image data.

The Fourier transform of the circle of confusion for image frames at different focus positions may be calibrated to different known distances. Processing circuitry 50 may compare the ratio of the Fourier transforms of image data between the N and N+1 frame to the calibrated Fourier transforms for the circle of confusion to determine the distance information. Processing circuitry 50 may subsequently use the distance information to apply rules for selecting image data from the focus bracket of image frames.

For example, processing circuitry 50 may select objects in the imaged scene within a given distance range from stacked-chip image sensor 16 to be in focus for the final focused image (e.g., processing circuitry may select only objects between 1 meter and 10 meters away from image sensor 16 to be in focus, etc.). In this example, stacked-chip image sensor 16 may determine the distance between each imaged object and stacked-chip image sensor 16 and may subsequently discard image frames with objects that are in focus outside of a predetermined distance range.

At step 128, processing circuitry 50 may combine the image frame at focus position N+1 with the image frame at focus position N to generate a combined image frame. If desired, processing circuitry 50 may combine image frame N+1 with image frame N using predetermined rules. For example, processing circuitry 50 may combine image frame N+1 and image frame N based on depth map information (e.g., as determined at step 126) by combing image data from image frames N and N+1 corresponding to objects separated from image sensor 16 by a selected distance.

As another example, processing circuitry 50 may combine image frames N+1 and N based on object detection by combining portions of the image frames having a detected object (e.g., as determined at step 90 of FIG. 7). As yet another example, processing circuitry 50 may combine image frames N+1 and N based on the image region 74 in each image frame having the best focus relative to previous image frames (e.g., so that the combined image has the best image focus for each image region 74). In general, any predetermined rules for combining image frame N and image frame N+1 may be used.

At step 130, stacked storage and processing circuitry 50 may add the combined image frame to an accumulated image frame in memory. The accumulated image frame may include multiple image focuses (e.g., image focuses in different image regions 74 as determined by the predetermined rules). If focus positions remain in the variable focus image bracket to be captured and processed, processing may loop back to step 122 via path 133 to capture additional image frames at additional focus positions. If no focus positions remain in the variable focus image bracket, processing may proceed to step 132 via path 131.

At step 132, stacked processing circuitry 50 may output the accumulated image frame from stacked-chip image sensor 16 at an output frame rate. The output frame rate may be less than the capture frame rate. For example, the output frame rate may be less than or equal to 60 frames per second, less than or equal to 30 frames per second etc. The accumulated image frame may contain multiple image focuses so that any desired portions of the scene are in focus in the final image. For example, all regions of the captured image, regions of the captured image from objects located at predetermined distances from image sensor 16, regions of the captured image corresponding to a detected object, or any other desired regions of the captured scene may be in-focus in the final image that is output from stacked-chip image sensor 16.

Figure 10:
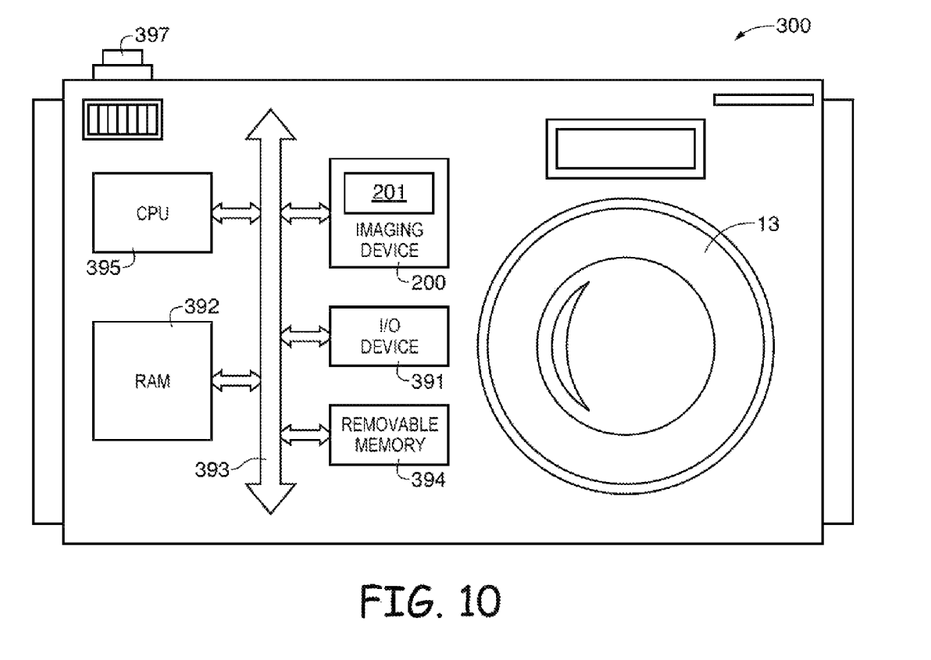
FIG. 10 is a block diagram of a processor system employing the image sensor of FIGS. 1-9 in accordance with an embodiment of the present invention.

FIG. 10 shows in simplified form a typical processor system 300, such as a digital camera, which includes an imaging device such as imaging device 200 (e.g., an imaging device 200 such as camera module 12 of FIG. 1 employing stacked storage and processing circuitry 50 and which is configured to capture variable focus image brackets for generating focused images to be data read out to processing circuitry 18 as described in connection with FIGS. 1-9). Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over has 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating systems and methods for operating an imaging system including an adjustable lens system and a stacked-chip image sensor.

The stacked-chip image sensor may include a planar array of image pixels and storage and processing circuitry. The stacked-chip image sensor may include a two-dimensional array of conductive metal vias coupled between the planar array of image pixels and the storage and processing circuitry. If desired, the stacked-chip image sensor may be coupled to off-chip image processing circuitry.

The adjustable lens system may include at least one moveable lens. The lens may be moved between a plurality of focus positions to pass light from a scene to the image pixels through the lens. The image pixels may capture a focus bracket of image frames while moving the lens in the adjustable lens system. For example, the image pixels may capture a first image frame from light that was passed by the adjustable lens system at a first focus position and may capture a second image frame from light that was passed by the adjustable lens system at a second focus position that is different from the first focus position. If desired, the image pixels may capture a respective image frame from the light at each focus position of the adjustable lens system.

Image data such as image signals for the focus bracket of image frames may be transferred to the storage and processing circuitry through the two-dimensional array of conductive vias. The storage and processing circuitry may combine a set of image frames from the focus bracket to generate a focused image (e.g., a focused image frame). The storage and processing circuitry may identify focused portions of selected image frames that are in focus relative to other image frames from the focus bracket. For example, the storage and processing circuitry may identify a focused portion of a first image frame in the focus bracket that is in focus relative to a second image frame in the focus bracket and may identify a focused portion of the second image frame that is in focus relative to the first image frame.

If desired, the storage and processing circuitry may gather depth map information for the scene by comparing selected image frames in the focus bracket. The storage and processing circuitry may combine selected image frames from the focus bracket based on the gathered depth map information.

If desired, the storage and processing circuitry may identify an object (e.g., a face) in the focus bracket of image frames and may compare each image frame in the focus bracket to determine which image frame has a best focus at the identified object. The image frame having the best focus at the identified object may be used as the focused image.

The storage and processing circuitry may output the focused image to the off-chip image processing circuitry at an output frame rate. If desired, the storage and processing circuitry may output the focus bracket of image frames to the off-chip image processing circuitry. The output frame rate may be less than the capture frame rate with which the image pixels captured the focus bracket. As examples, the output frame rate may be less than or equal to 60 frames per second or less than or equal to 30 frames per second whereas the capture frame rate may be greater than or equal to 90 frames per second or greater than or equal to 120 frames per second.

The stacked-chip image sensor and associated stacked-chip storage and processing circuitry for capturing focus brackets of image frames may be implemented in a system that also includes a central processing unit, memory, and input-output circuitry.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for operating an imaging system having a stacked-chip image sensor and an adjustable lens system to capture an image of an object in a scene, wherein the stacked-chip image sensor comprises a planar array of image pixels and storage and processing circuitry, the method comprising:
    moving at least one lens in the adjustable lens system into a plurality of focus positions while passing light from a scene to the image pixels through the at least one lens;
    with the image pixels, capturing a focus bracket of image frames while moving the at least one lens;
    with the storage and processing circuitry, gathering depth map information for the scene by comparing a first image frame in the focus bracket with a second image frame in the focus bracket, wherein gathering the depth map information comprises determining a distance between the object in the scene and the imaging system; and
    with the storage and processing circuitry, combining a set of image frames from the focus bracket of image frames to generate a focused image based on the gathered depth map information.

2. The method defined in claim 1, wherein the stacked-chip image sensor further comprises a two-dimensional array of conductive vias, the method further comprising:
    with the two-dimensional array of conductive vias, transferring image signals for the captured focus bracket of image frames to the storage and processing circuitry.

3. The method defined in claim 1, wherein moving the at least one lens in the adjustable lens system into the plurality of focus positions while passing the light from the scene to the image pixels through the at least one lens comprises:
    passing the light to the image pixels while the at least one lens is at a first focus position in the plurality of focus positions; and
    passing the light to the image pixels while the at least one lens is at a second focus position in the plurality of focus positions, wherein the second focus position is different from the first focus position.

4. The method defined in claim 3, wherein capturing the focus bracket of image frames comprises:
    capturing the first image frame while the at least one lens is at the first focus position; and
    capturing the second image frame while the at least one lens is at the second focus position.

5. The method defined in claim 4, wherein combining the set of image frames to generate the focused image comprises:
    identifying a focused portion of the second image frame that is in focus relative to the first image frame.

6. The method defined in claim 5, wherein combining the set of image frames to generate the focused image further comprises:
    identifying a focused portion of the first image frame that is in focus relative to the second image frame.

7. The method defined in claim 6, wherein combining the set of image frames to generate the focused image further comprises:
    combining the focused portion of the first image frame with the focused portion of the second image frame to generate the focused image.

8. The method defined in claim 1, wherein combining the set of image frames from the focus bracket of image frames to generate the focused image comprises:
    combining the set of image frames from the focus bracket of image frames based on the gathered depth map information.

9. The method defined in claim 1, wherein combining the set of image frames to generate the focused image further comprises:
- identifying the object in the focus bracket of image frames;
- comparing each image frame in the focus bracket of image frames to determine which image frame in the focus bracket of image frames has a best focus at the identified object; and
- identifying an image frame having the best focus at the identified object as the focused image.

10. The method defined in claim 1, further comprising:
- with the storage and processing circuitry, outputting the focus bracket of image frames to external circuitry.

11. A system, comprising:
- a central processing unit;
- memory;
- input-output circuitry; and
- an imaging device, wherein the imaging device comprises:
  - a stacked-chip image sensor having a pixel array and storage and processing circuitry;
  - image processing circuitry coupled to the stacked-chip image sensor; and
  - an adjustable lens system that focuses light from a scene onto the pixel array, wherein the adjustable lens system is configured to pass light from the scene to the image pixels, wherein the image pixels are configured to capture a focus bracket of image frames at a capture frame rate, wherein the storage and processing circuitry is configured to gather depth map information for the scene by comparing a first image frame in the focus bracket with a second image frame in the focus bracket, wherein gathering the depth map information comprises determining a distance between an object in the scene and the imaging device, wherein the storage and processing circuitry is configured to combine a set of image frames from the focus bracket of image frames to generate a focused image based on the gathered depth map information, and wherein the storage and processing circuitry is configured to output the focused image at an output frame rate that is less than the capture frame rate.

12. The system defined in claim 11, wherein the capture frame rate is greater than or equal to 90 frames per second and wherein the output frame rate is less than or equal to 60 frames per second.

13. The system defined in claim 11, wherein the storage and processing circuitry is further configured to:
- compute a first Fourier transform of a circle of confusion of an image frame in the focus bracket of image frames, wherein the image frame is captured at a given focus position, and wherein the Fourier transform of the circle of confusion corresponds to a distance associated with the given focus position;
- compute a second Fourier transform for image data of an additional image frame in the focus bracket of image frames; and
- determine an additional distance between the imaging device and an object in the additional image frame by comparing the second Fourier transform for the image data of the additional image frame with the first Fourier transform of the circle of confusion.

* * * * *